A. S. STONE.
REMOVABLE BRIDGE FOR DENTAL WORK.
APPLICATION FILED FEB. 20, 1919.

1,340,089.

Patented May 11, 1920.

WITNESSES
Oliver W. Holmes
J. C. Ledbetter

INVENTOR
A. S. STONE
BY Munn & Co
ATTORNEYS

UNITED STATES PATENT OFFICE.

ARTHUR S. STONE, OF BROOKLYN, NEW YORK.

REMOVABLE BRIDGE FOR DENTAL WORK.

1,340,089.  Specification of Letters Patent.  Patented May 11, 1920.

Application filed February 20, 1919. Serial No. 278,168.

*To all whom it may concern:*

Be it known that I, ARTHUR S. STONE, a citizen of the United States, and a resident of the city of New York, borough of Brooklyn, in the county of Kings and State of New York, have invented a new and Improved Removable Bridge for Dental Work, of which the following is a full, clear, and exact description.

This invention relates to dentistry, and more particularly to removable bridge work.

An object of the invention is to provide a new and usefully improved means for restoring teeth within a person's mouth. A particular object of the invention is to provide an improved form of removable bridge work which may be fitted to sound teeth of a patient's mouth and support an artificial tooth so as to adequately fill a space left by the loss of a natural tooth.

A further object of the invention is to provide an improved bridge work which may be removable for the purpose of cleansing the artificial members so that hygienic conditions may exist.

Finally, it is an object of the invention to provide a simple and effective form of removable bridge work which will be comparatively inexpensive to construct and simple and positive in application.

With the above principal objects, and others in view, the invention has relation to a certain combination of dental parts, an example of which is described in the following specification, pointed out in the appended claims, and illustrated in the accompanying drawings, wherein:

Referring more in particular to the drawings, the numerals 1 and 2 point out two sound and original teeth in the forward portion of the patient's mouth. These teeth 1 and 2 are depended upon to support and carry the removable bridge work. They are prepared by carefully drilling small cavities thereinto, and a metallic inlay is next prepared in the usual manner and anchored in the cavity. The metallic inlay is usually built up by taking a cast or mold of the cavity form and from this mold the inlay is prepared.

Figure 6:
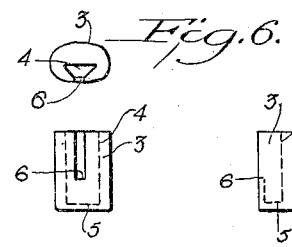
Fig. 6 shows a plan, front, and side view of a certain metallic inlay provided with a dove-tail groove which forms a part of this invention.

The inlay 3 is anchored in the cavities prepared in the two sound teeth 1 and 2. This inlay 3 is properly anchored in position by cementing or otherwise securing same as is known to those skilled in the art, and is provided with a dove-tail groove 4 as illustrated in the three detailed views shown in Fig. 6. Fig. 6 is employed to bring out the top, front and side views of the dove-tail metallic inlay. The dove-tail groove 4 is prepared in the inlay 3 and extends from one end of the inlay to approximately the other end thereof, but terminates before passing through the inlay body so as to form a wall 5. The groove 4 is opened down the front face of the metallic inlay and terminates so as to form the stop or abutment 6.

The two sound teeth 1 and 2 are spaced apart which means that the patient has lost a tooth originally grown thereinbetween. In practising the first form of the invention it is desired to install an artificial tooth in between the two sound teeth.

A support bar 7 is employed and permanently joined to an artificial tooth 8. The artificial tooth 8 is usually constructed of porcelain or other suitable material known to those skilled in dental mechanics. The bar 7 will, of course, be formed of gold, platinum-iridium or other non-corrosive matter. The tooth 8 is permanently joined to the bar. This bar is provided on each end thereof with a dove-tail key 10. The two dove-tail keys 10 are shaped to conform in cross-sectional area and size to the dove-tail groove 4. The removable bridge comprising the bar 7 and tooth 8 with the integrally formed dove tail keys 10 are passed into position within the dove tail groove 4 of the two inlays 3. This readily supports the removable bridge work and mounts the tooth 8 in properly associated relation with the two sound teeth.

Figure 1:
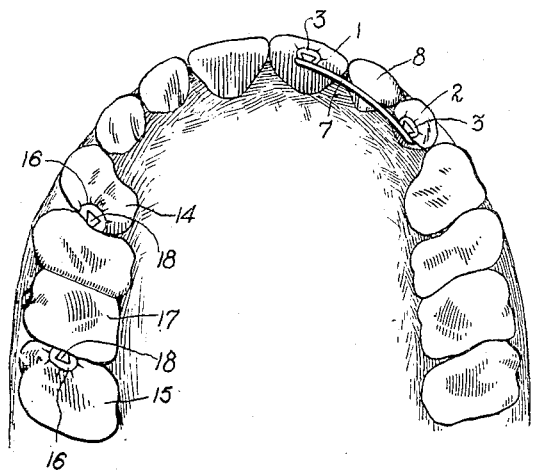
Figure 1 shows a diagrammatical view of a set of teeth with the removable bridge work comprising this invention shown in connection therewith.
Figure 3:
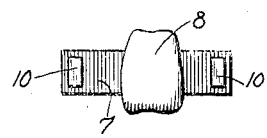
Figs. 2 and 3 show a plan and front view respectively of one form of removable bridge work.
Figure 2:
Figure 4:
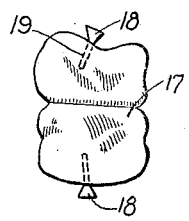
Figs. 4 and 5 show respectively a plan and side view of a modified form of bridge work.
Figure 5:
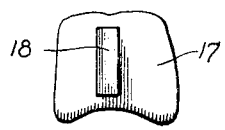
Figure 7:
Fig. 7 shows a perspective view of a certain form of anchor and dove-tail key.

Figs. 4 and 5 show a slightly modified form of the invention. This particular form of dental work is employed for installing artificial teeth or removable bridge work within the rear portions of the patient's mouth. This form is more readily adapted for installing jaw teeth.

In this case the natural jaw teeth 14 and 15 are employed for supporting the removable artificial set. The two sound teeth 14 and 15 are prepared by drilling and forming small cavities therein. The inlays 16 are then installed similarly to the ones as heretofore described for the front teeth. An artificial set or removable bridge 17 is then fitted with dove tail supporting keys and placed in position between the sound teeth. The artificial set 17 may comprise one or more teeth and in such case the several teeth will be constructed so as to conform in outline to the several teeth, but will be built in an integral set. A dove tail key 18 made integrally with an anchor web 19 is permanently set within the artificial teeth 17. The anchor web 19 is usually soldered to an inlay, or it may be molded or cast within an inlay. The inlay fitted with the web and key are then anchored in position within the opposite ends of the teeth 17. The keys 18 carried upon each end of the artificial teeth are made to register with the dove tail groove of the inlay 16 by properly alining the parts before the dental job is completed in its entirety. The artificial teeth 17 are then inserted into position, and may be removed at will by carefully lifting upwardly on the bridge 17 until it is withdrawn from the supporting inlays.

The detailed views of Fig. 6 show the inlay provided with a stop 6 and bottom closed wall 5. The web 19 and integral dove tail key 18 are even or flush at one end thereof, while at the other end the dove tail key 18 extends somewhat beyond the edge of the web 19. When the key 18 is inserted within the dove tail groove 4 the extended end of the key will lie in position within the bottom of the groove and rest in contact with the wall 5, and the lower edge of the web 19 will engage in contacting relation with the stop 6. This form of construction, therefore, adequately provides close fitting parts which makes for the security and rigidity of the assembled bridge work.

It may be preferable to employ the firstly described form, namely the support bar 7 and tooth 8 where an artificial tooth is to be installed adjacent to a comparatively small tooth, while the lastly described form will preferably be employed where the artificial dentures are to be mounted adjacent jaw teeth.

This form of removable dentures can be readily taken from the mouth by the wearer and thoroughly cleaned at any time, whereas fixed dentures cannot be of the same hygienic nature. This invention provides a long-felt want for dependable and removable bridge work.

Having thus described my invention, what I claim as new, and desire to secure by Letters Patent is:

1. Denture parts, comprising; a metallic inlay provided with a dove tail groove, and an abutment adjacent one end of the groove, and a dove tail key adapted to register with the dove tail groove and pass beyond the abutment.

2. Removable bridge work, comprising in combination; a metallic inlay provided with a dove tail groove closed at one end to form a stop, a support bar, an artificial denture fixed to the support bar, and a dove tail key fixed to the support bar to register with the dove tail groove of the inlay and abut stop.

3. A removable denture bridge comprising, in combination with a pair of spaced teeth: inlay fitted in the spaced teeth, each inlay provided with a dove-tailed groove, an artificial denture or tooth disposed between the spaced teeth, a support bar rigidly fixed to the artificial tooth, and a dove-tail key fixed to each end of the support bar adapted to register with the dove-tailed grooves to hold the support bar and artificial tooth in fixed position between the spaced teeth, said dove tail key fixed at right angles to the support bar.

4. A removable denture bridge, in combination with sound spaced teeth acting as supports: of a support bar, a denture fixed to the support bar, dove-tail grooved inlays fitted in the spaced tooth supports, an abutment stop formed in each grooved inlay, a key fixed to each end of the support bar to register with the dove tail groove and project beyond the abutment stop, said dove tail key fixed at right angles to the support bar.

ARTHUR S. STONE.